United States Patent
Tan et al.

(10) Patent No.: US 9,246,895 B2
(45) Date of Patent: Jan. 26, 2016

(54) SETTING METHOD, DEVICE AUTHENTICATION METHOD, DEVICE AUTHENTICATION SYSTEM, AND SERVER

(71) Applicant: Panasonic Intellectual Property Management Co., Ltd., Osaka (JP)

(72) Inventors: Pek Yew Tan, Singapore (SG); Tien Ming Benjamin Koh, Singapore (SG); Nandhakumar Ellappan, Singapore (SG); Kazufumi Kumagai, Osaka (JP); Daigo Senoo, Osaka (JP); Yosuke Tajika, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 1 day.

(21) Appl. No.: 13/762,483

(22) Filed: Feb. 8, 2013

(65) Prior Publication Data
US 2013/0232556 A1 Sep. 5, 2013

Related U.S. Application Data

(60) Provisional application No. 61/597,205, filed on Feb. 10, 2012, provisional application No. 61/668,227, filed on Jul. 5, 2012.

(51) Int. Cl.
*G06F 7/04* (2006.01)
*G06F 15/16* (2006.01)
(Continued)

(52) U.S. Cl.
CPC .............. *H04L 63/08* (2013.01); *G06F 13/00* (2013.01); *G06F 21/33* (2013.01); *G06F 21/44* (2013.01);
(Continued)

(58) Field of Classification Search
CPC ....... G06Q 50/06; G06Q 10/06; G06Q 10/00; H04L 12/10; H04L 41/0803; H04L 41/0806; H04L 63/00; H04L 63/08; H04L 63/0876; H04L 63/0892; H04L 63/18; H04L 63/20; G05B 15/02; G05B 2219/2642; H04Q 2209/60; Y02B 70/3266; Y02B 90/2669; Y02B 70/325; Y02B 40/128; Y02B 20/30–20/52
USPC ................................ 726/2–4, 6, 9, 16–19, 21
See application file for complete search history.

(56) References Cited

U.S. PATENT DOCUMENTS 7,950,044 B2    5/2011  Brandt et al.
8,718,798 B2 *  5/2014  Bultman ................ G01D 4/002
                                                          700/22
(Continued)

FOREIGN PATENT DOCUMENTS

JP  2002-015235   1/2002
JP  2006-042207   2/2006
(Continued)

OTHER PUBLICATIONS
International Search Report issued May 7, 2013 in International (PCT) Application No. PCT/JP2013/000691.
(Continued)

*Primary Examiner* — Ashok Patel
*Assistant Examiner* — Daniel Potratz
(74) *Attorney, Agent, or Firm* — Wenderoth, Lind & Ponack, L.L.P.

(57) ABSTRACT

A method of setting which includes: obtaining, from a smart meter, an ID of the smart meter; obtaining, from a HEMS-controller, an ID and a certificate of the HEMS-controller and an ID and a certificate of an appliance controlled by the HEMS-controller; generating management information in which the ID of the smart meter, the ID and the certificate of the HEMS-controller, and the ID and the certificate of the appliance are associated with one another; and transmitting, based on the management information, the ID and the certificate of the HEMS-controller and the ID and the certificate of the appliance which are associated with the ID of the smart meter, to the smart meter.

15 Claims, 9 Drawing Sheets

(51) Int. Cl.
- *G06F 17/30* (2006.01)
- *H04L 29/06* (2006.01)
- *G06F 13/00* (2006.01)
- *G06F 21/44* (2013.01)
- *H02J 13/00* (2006.01)
- *G06F 21/33* (2013.01)

(52) U.S. Cl.
CPC ........... *H02J 13/001* (2013.01); *H02J 13/0079* (2013.01); *H04L 63/0876* (2013.01); *Y04S 10/40* (2013.01); *Y04S 20/30* (2013.01)

(56) References Cited

U.S. PATENT DOCUMENTS

| | | | |
|---|---|---|---|
| 8,832,428 B2* | 9/2014 | Ota | H04W 12/04 713/153 |
| 2006/0085839 A1 | 4/2006 | Brandt et al. | |
| 2007/0162748 A1 | 7/2007 | Okayama et al. | |
| 2007/0209063 A1 | 9/2007 | Ohto | |
| 2010/0034386 A1* | 2/2010 | Choong | H04L 9/0894 380/270 |
| 2011/0016517 A1* | 1/2011 | Kasahara | G01D 4/002 726/7 |
| 2011/0047370 A1 | 2/2011 | Nagel et al. | |
| 2011/0302635 A1 | 12/2011 | Pratt, Jr. et al. | |
| 2012/0083937 A1* | 4/2012 | Kong | G06Q 50/06 700/295 |
| 2012/0250864 A1 | 10/2012 | Nishibayashi et al. | |

FOREIGN PATENT DOCUMENTS

| | | |
|---|---|---|
| JP | 2006-072493 | 3/2006 |
| JP | 2007-184756 | 7/2007 |
| WO | 2005/101162 | 10/2005 |
| WO | 2011/064865 | 6/2011 |

OTHER PUBLICATIONS

Erman Ayday, Sridhar Rajagopal, "Secure, Intuitive and Low-Cost Device Authentication for Smart Grid Networks", CCNC' 2011:2011 IEEE Consumer Communications and Networking Conference, IEEE Jan. 11, 2011, p. 1161-p. 1165, ISBN: 978-1-4244-8790-5.

* cited by examiner

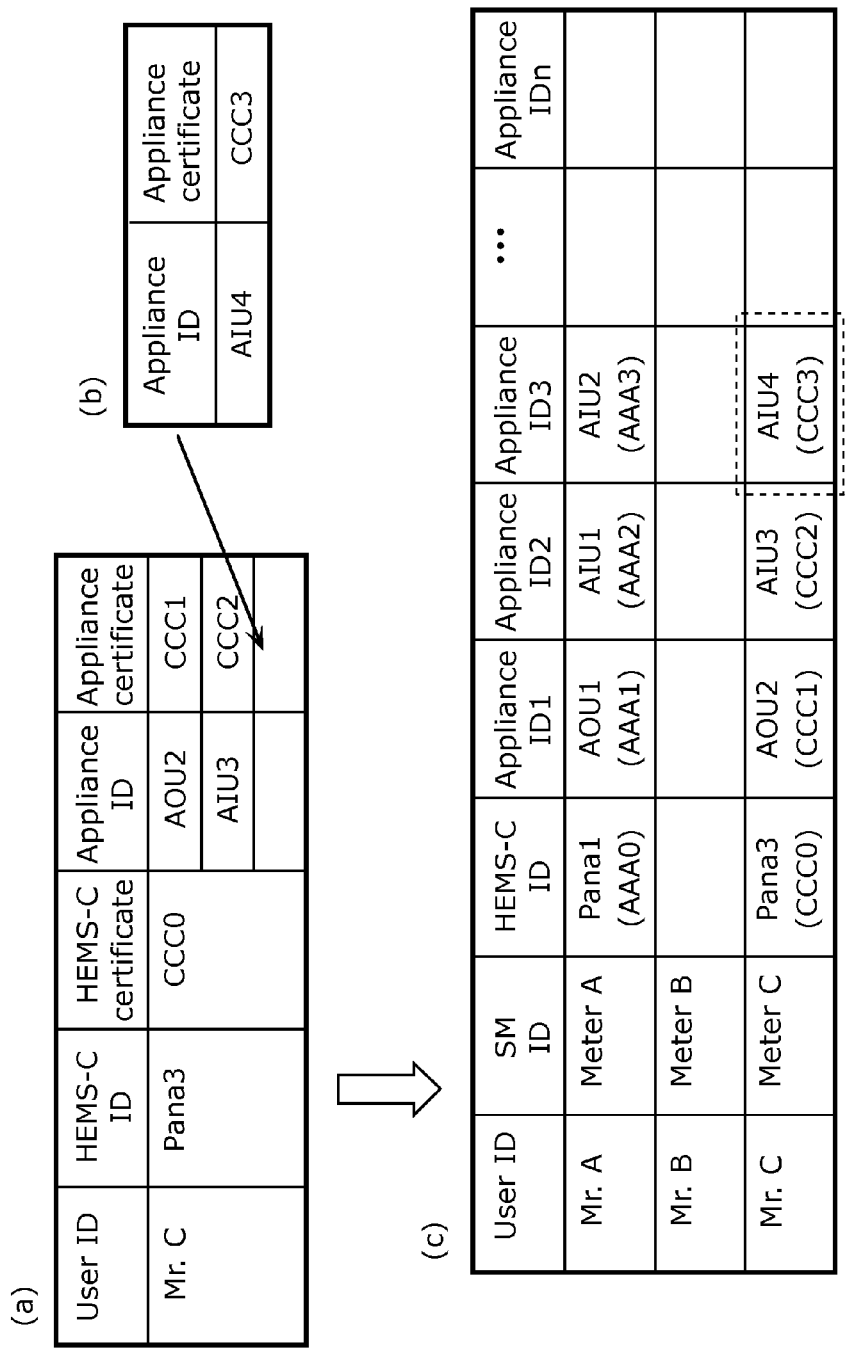

SETTING METHOD, DEVICE AUTHENTICATION METHOD, DEVICE AUTHENTICATION SYSTEM, AND SERVER

CROSS REFERENCE TO RELATED APPLICATIONS

The present application claims the benefit of U.S. Provisional Patent Application No. 61/597,205 filed on Feb. 10, 2012, and U.S. Provisional Patent Application No. 61/668,227 filed on Jul. 5, 2012. The entire disclosure of the above-identified application, including the specification, drawings and claims is incorporated herein by reference in its entirety.

FIELD

The present disclosure relates to methods of setting identifications (IDs) and certificates of devices to smart meters, methods of authenticating devices including the smart meters, and the like.

BACKGROUND

Along with the introduction of a smart grid (next-generation grid-system), smart meters including a communication and controlling function is becoming widely used.

On the other hand, the number of appliances, such as an air conditioner, which are used at home and having communication functions is increasing. Home energy management system (HEMS) which controls the appliances at home by a HEMS-controller using the communication functions of such appliances is gaining attention.

Furthermore, through the communication between the smart meters, the HEMS-controllers and the appliances, provision of various services is considered which is made possible, for example, by transmitting control signals, such as demand response (DR) signal, from the smart meters to the HEMS controllers and appliances.

CITATION LIST

Patent Literature

[PTL 1]
US Patent Application Publication No. 2011/0047370
[PTL 2]
U.S. Pat. No. 7,950,044
[PTL 3]
US Patent Application Publication No. 2011/0302635

SUMMARY

Technical Problem

For the communication between a smart meter, a HEMS-controller, and an appliance, it is necessary to set (store) in the smart meter the ID and the certificate information of each of the HEMS-controller and the appliance beforehand.

In view of this, non-limiting and exemplary embodiments provide, for example, a method of setting the ID and the certificate information of the appliance to the smart meter easily.

Solution to Problem

A method of setting according to an aspect of the present disclosure is a method of setting an identification (ID) and authentication information for each of devices to a smart meter, the ID and the authentication information being used for authentication for network connection between the smart meter and the devices, the method including: obtaining an ID of the smart meter connected via a first communication network, the ID being associated with user information of the smart meter; obtaining (i) an ID and authentication information of a controller which are associated with user information of the controller connected via a second communication network and (ii) an ID and authentication information of an appliance, the controller and the appliance each being one of the devices; generating, based on the user information of the smart meter and the user information of the controller, management information in which the ID of the smart meter, the ID and the authentication information of the controller, and the ID and the authentication information of the appliance are associated with one another; and transmitting, based on the management information, the ID and the authentication information of the controller and the ID and the authentication information of the appliance which are associated with the ID of the smart meter, to the smart meter.

These general and specific aspects may be implemented using an apparatus, a system, an integrated circuit, a computer program, or a computer-readable recording medium, such as a CD-ROM, or any combination of apparatuses, systems, integrated circuits, computer programs, or computer-readable recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

According to the present disclosure, ID and certificate information of a device can be easily set to a smart meter.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 8 is a diagram showing an example of updating of data in a database in a remote server, which occurs when a new appliance is connected to a HEMS-controller in Embodiment 3.

DESCRIPTION OF EMBODIMENTS

Figure 1A:
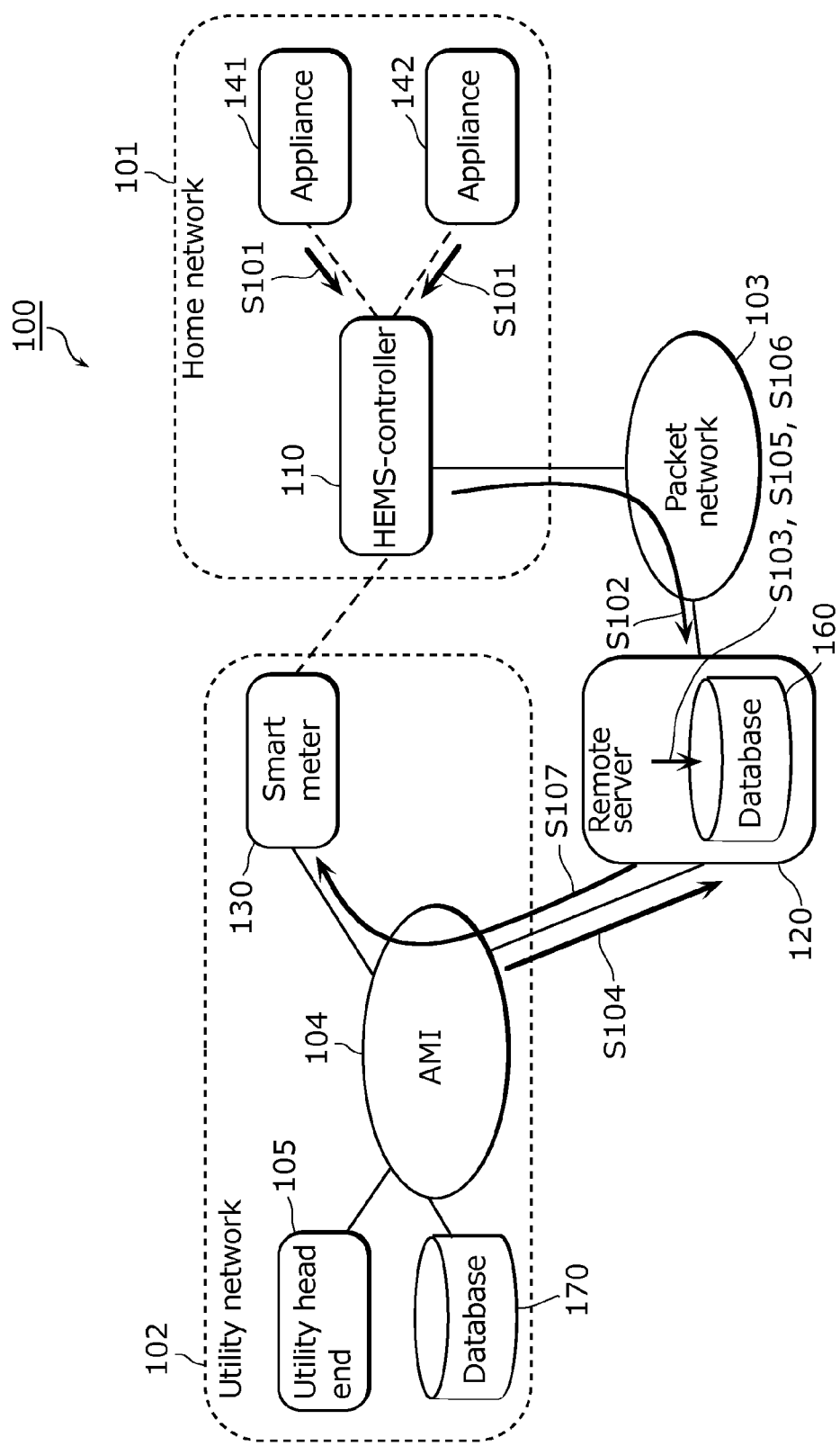
FIG. 1A is a system configuration figure of a device authentication system according to Embodiment 1.

A method of setting according to an aspect of the present disclosure is a method of setting an identification (ID) and a certificate for each of devices to a smart meter, the ID and the certificate being used for authentication for network connection between the smart meter and the devices, the method including: obtaining, from a smart meter connected via a first communication network, an ID of the smart meter associated with user information of the smart meter; obtaining, from a controller which is one of the devices connected via a second communication network, (i) an ID and a certificate of the controller associated with user information of the controller and (ii) an ID and a certificate of an appliance which is one of the devices controlled by the controller; generating, based on user information of the smart meter and user information of the controller, management information in which the ID of the smart meter, the ID and the certificate of the controller, and the ID and the certificate of the appliance are associated with one another; and transmitting, based on the management information, the ID and the certificate of the controller and the ID and the certificate of the appliance which are associated with the ID of the smart meter, to the smart meter.

As described, the IDs and the certificates of devices (HEMS-controller and appliance) can be set to the smart meter more easily.

Furthermore, for example, when new device information that is (i) an ID and a certificate of the controller which are not included in the management information or (ii) an ID and a certificate of the appliance which are not included in the management information is obtained via the second communication network: in the generating, the management information may be updated by adding the new device information to the management information in association with the ID of the smart meter; and in the transmitting, the new device information may be transmitted to the smart meter having the ID associated with the new device information.

Furthermore, for example, the first communication network may be a secure communication network dedicated to communication with the smart meter.

Furthermore, for example, the controller may be a home energy management system (HEMS) controller which controls a device among the devices.

Furthermore, for example, the ID of each of the devices may be a media access control (MAC) address.

A device authentication method according to an aspect of the present disclosure is a device authentication method for authenticating network connection between a smart meter and a plurality of devices by using a server, the method including: (a) obtaining, by a controller which controls an appliance, an identification (ID) and a certificate of the appliance, the controller and the appliance each being one of the devices; (b) transmitting, by the controller, the ID and the certificate of the appliance obtained in step (a) to the server; (c) obtaining, by the server, an ID of the smart meter associated with user information of the smart meter; (d) obtaining, by the server, an ID and a certificate of the controller and the ID and the certificate of the appliance which are associated with user information of the controller; (e) generating, by the server, management information based on the user information of the smart meter and the user information of the controller, the management information including the ID of the smart meter obtained in step (c), and the ID and the certificate of the controller and the ID and the certificate of the appliance obtained in step (d) in association with one another; and (f) transmitting, by the server, based on the management information, the ID and the certificate of the controller and the ID and the certificate of the appliance which are associated with the ID of the smart meter, to the smart meter.

As described, the IDs and the certificates of devices can be set to the smart meter more easily with the device authentication system.

Furthermore, for example, the device authentication method according to an aspect of the present disclosure may further include (g) obtaining, by the smart meter, the ID and the certificate of the controller and the ID and the certificate of the appliance from the server; and (h) when the smart meter receives an authentication request from the controller or the appliance, (i) determining, by the smart meter, whether an ID and a certificate included in the authentication request match the ID and the certificate obtained in step (g) and, (ii) when the ID and the certificate in the authentication request match the ID and the certificate obtained in step (g), permitting, by the smart meter, a network connection between the controller or the appliance which transmitted the authentication request and the smart meter, the authentication request being information which requests authentication.

Furthermore, for example, in step (a), the controller may communicate with the appliance by a wireless communication compliant with a Zigbee (Zigbee is a registered trademark) standard to obtain the ID and the certificate of the appliance.

A device authentication system according to an aspect of the present disclosure is a device authentication system in which an identification (ID) and a certificate of a device is set to a smart meter by a server, the ID and the certificate being used for authentication for network connection between the smart meter and a plurality of the devices, the system including: a controller which controls an appliance, the controller and the appliance each being one of the devices; and a server, wherein the controller includes: a first communication unit configured to obtain an ID and a certificate of the appliance; and a second communication unit configured to transmit the ID and the certificate of the appliance obtained by the first communication unit to the server, and the server includes: a first obtainment unit configured to obtain an ID of the smart meter associated with user information of the smart meter; a second obtainment unit configured to obtain an ID and a certificate of the controller and the ID and the certificate of the appliance which are associated with user information of the controller; a system manager which generates, based on the user information of the smart meter and the user information of the controller, management information in which the ID of the smart meter obtained by the first obtainment unit, and the ID and the certificate of the controller and the ID and the certificate of the appliance obtained by the second obtainment unit are associated with one another; and a transmitting unit configured to transmit, based on the management information, the ID and the certificate of the controller and the ID and the certificate of the appliance which are associated with the ID of the smart meter, to the smart meter.

A controller according to an aspect of the present disclosure is a controller which performs communication for a first pairing that is a wireless network connection between a device and a smart meter, the first pairing being performed after a server transmitted authentication information of the device to the smart meter, the controller including: a first communication unit configured to perform a second pairing which is a wireless network connection with the device, to obtain authentication information of the device; and a second communication unit configured to transmit the authentication information of the device obtained by the first communication unit, to the server.

As described, before the final pairing (first pairing) in which the smart meter and the device are connected via a wireless network is performed, the controller performs the second pairing in which the controller and the appliance are preliminary connected. With this, the controller can obtain the ID and the certificate of each of the appliances at one time, and can transmit the IDs and the certificates to the server in a batch. Thus, the IDs and the certificates can be transmitted to the smart meter more easily.

Furthermore, for example, the first communication unit may, after obtaining the authentication information of the device, cancel the second pairing before the first pairing is performed.

Furthermore, for example, the first pairing and the second pairing may be wireless network connections compliant with a Zigbee standard.

These general and specific aspects may be implemented using an apparatus, a system, a method, an integrated circuit, a computer program, or a computer-readable recording medium, such as a CD-ROM, or any combination of systems, methods, integrated circuits, computer programs, or computer-readable recording media.

Hereinafter, embodiments are specifically described in greater detail with reference to the accompanying Drawings.

Each of the embodiments described below shows a general or specific example. The numerical values, shapes, materials, structural elements, the arrangement and connection of the structural elements, steps, the processing order of the steps etc. shown in the following exemplary embodiments are mere examples, and therefore do not limit the scope of the present disclosure. Therefore, among the structural elements in the following embodiments, structural elements not recited in any one of the independent claims defining the most generic concept are described as arbitrary structural elements.

Embodiment 1

First, an outline of a device authentication system according to this embodiment is described.

FIG. 1A is a system configuration figure of a device authentication system according to Embodiment 1.

In FIG. 1A, a device authentication system 100 includes a smart meter (SM) 130, a HEMS-controller (HEMS-C) 110, and a remote server 120. Furthermore, the device authentication system 100 may further include appliances 141 and 142.

A home network 101 shown in FIG. 1A is a network in the house of a user. Furthermore, a utility network 102 is, for example, a network of an infrastructure business operator, such as a power company, a gas company, or a water company.

Here, the smart meter 130 is a meter including a communication function and is provided inside the house of a user. The smart meter 130 transmits the amount of power consumed, the amount of gas used, the amount of water used, or the like of the house of the user to the corresponding infrastructure business operator via an advanced metering infrastructure (AMI) 104.

By making the smart meter 130, the HEMS-controller 110, and appliances 141 and 142 (hereafter collectively denoted as appliances 140) communicate mutually, provision of various services on the HEMS-controller 110 and the appliances 140 is conceivable using the information of the smart meter 130. However, to enable the smart meter 130, the HEMS-controller 110, and appliances 140 to communicate securely, the device ID and the certificate (authentication information used for communication, such as an account and a password) of each of the HEMS-controller 110 and appliances 140 need to be set to the smart meter 130 beforehand.

However, in most cases, business operators who provide the HEMS-controller 110 and appliances 140 are different from the infrastructure business operator who installed the smart meter 130 in the house of a user. Thus, to store the IDs and the certificates of the above-described devices into the smart meter 130, it is usually necessary to request the infrastructure business operator to dispatch a worker, and the worker needs to perform a task (construction) of setting the device ID and the certificate to the smart meter 130. More specifically, every time new appliances 140 are added to the house of the user, registration (setting) of the device ID and the certificate to the smart meter 130 needs to be requested to the infrastructure business operator. Thus, it is rather inconvenient and problematic.

In view of this, in the device authentication system 100 according to this embodiment, the remote server 120 sets the HEMS-controller 110 and the appliances 140 in the house of the user as the communication target devices of the smart meter 130. This enables the user or the business operators (manufacturers) of the appliances 140 to store in the smart meter 130 the device IDs and the certificates of the appliances with a simple procedure, that is, transmission of the device IDs and the certificates via a packet network 103 from the HEMS-controller 110.

As a result, the smart meter 130, the HEMS-controller 110, and the appliances 140 are connected via the same network, and thus these devices can communicate mutually. In other words, the aforementioned services that use the above-described information of the smart meter 130 are realized.

The following describes each of structural elements of the device authentication system 100 with reference to FIG. 1A.

In FIG. 1A, it is assumed that the smart meter 130 is installed in the house of a user (not shown). The smart meter 130 is, as AMI 104, connected to the utility network 102. The smart meter 130 is controlled by a utility head end 105 in the utility network 102. It should be noted that the database 170 is provided in the utility network 102.

Using the AMI, the utility head end 105 examines the amount of power consumed, the amount of gas used, the amount of water used, or the like of the house of the user from the smart meter 130. Furthermore, the smart meter 130 can transmit a control signal to the HEMS-controller 110 and each of appliances 140 which are communication targets.

The appliances 140, such as an air conditioner, a refrigerator, and a washing machine, are connected to the HEMS-controller 110 via a communication network. More specifically, the HEMS-controller 110 controls the appliances 140 connected to the HEMS-controller 110. It should be noted that, here, the appliances 140 are not limited to the devices used at home, but represent various electrical devices, such as office appliance (e.g., a copying machine), medical equipment, or the like. In other words, the appliances 140 mentioned here represent general electrical devices.

In FIG. 1A, the smart meter 130, the AMI 104, and the utility head end 105 are included in the utility network 102. Furthermore, the HEMS-controller 110 and the appliances 140 are included in the home network 101 in the house of a user.

The remote server 120 collects (obtains) the ID and the certificate of each of the appliances 140 connected to the HEMS-controller 110 and makes, based on the ID and the certificate of each of the appliances 140, an authentication request to the target smart meter 130 in which the setting is to be made. It should be noted that the remote server 120 is provided outside the house of the user (outside of the building in which the smart meter 130, the HEMS-controller 110, and the appliances 140 are provided), and is managed by, for example, a manufacturer of the HEMS-controller 110 or the appliances 140. Furthermore, the remote server 120 includes a database 160.

Next, outline of operations performed by the device authentication system 100 is described with reference to FIG. 1A and FIG. 1B.

Figure 1B:
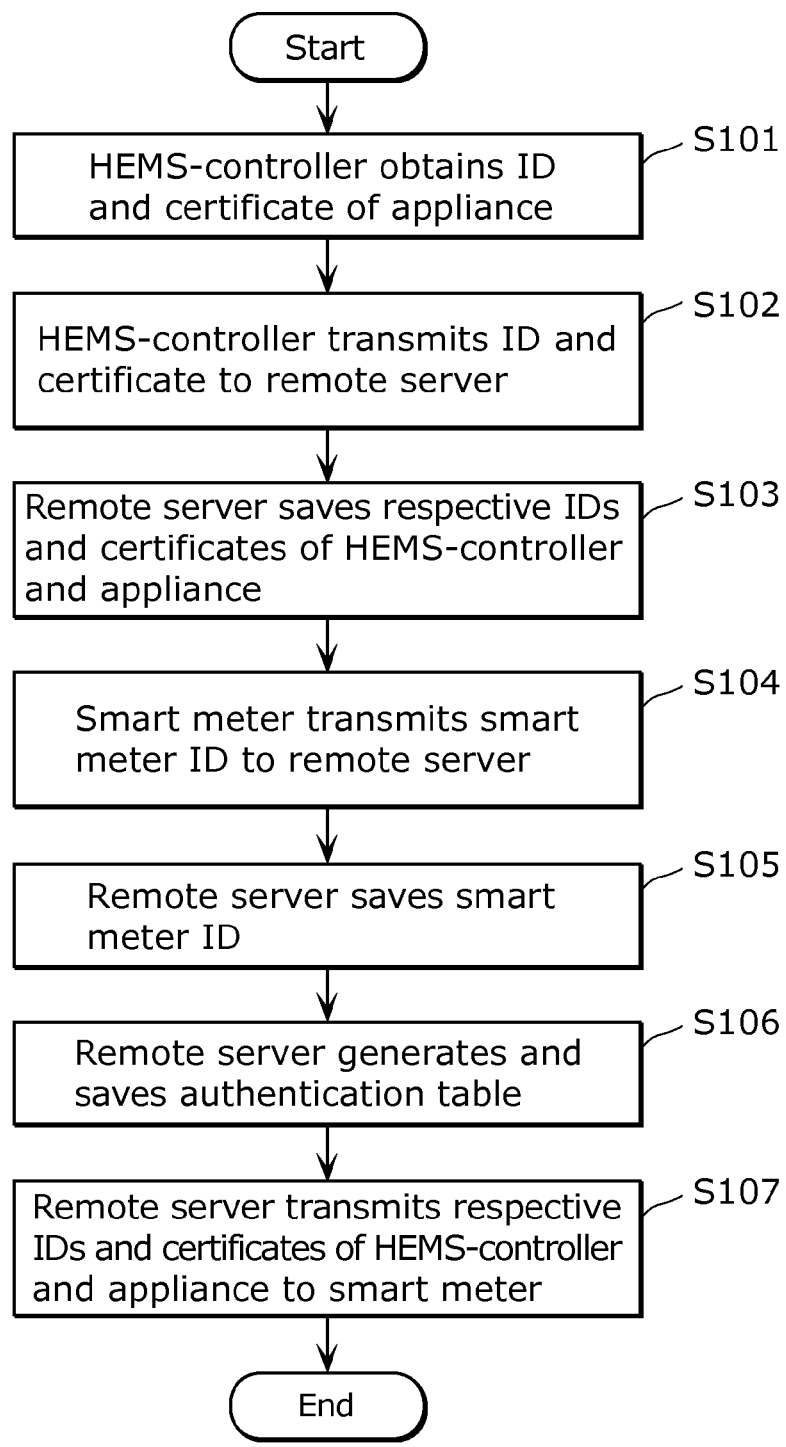
FIG. 1B is a flowchart showing operations performed by the device authentication system according to Embodiment 1.

FIG. 1B is a flowchart showing operations performed by the device authentication system 100.

First, the HEMS-controller 110 obtains the ID and the certificate of each of the appliances 140 (S101). The ID of each of the appliances 140 is, specifically, the media access control (MAC) address of the appliance. However, the ID may be other information that can identify the appliance. The same applies to the ID of the HEMS-controller 110 and the ID of the smart meter 130 which are to be described later.

It should be noted that, at this time, the HEMS-controller 110 is connected to the appliances 141 and 142 via a wireless network. Details of the wireless connection (a second pairing) will be described later.

Next, the HEMS-controller 110 transmits (i) the ID and the certificate of the HEMS-controller 110 and (ii) the ID and the certificate of each of the appliances 140 obtained in Step S101 to the remote server 120 (S102). The HEMS-controller 110 and the remote server 120 communicate using the packet network 103. Specifically, an example of the packet network 103 is the Internet.

Next, the remote server 120 saves in the database 160 the received ID and the certificate of the HEMS-controller 110 and the ID and the certificate of each of the appliances 140 as a HEMS-C and appliance management table (S103).

Next, the smart meter 130 transmits the ID of the smart meter 130 to the remote server 120 (S104).

The remote server 120 saves in the database 160 the received ID of the smart meter 130 as a smart meter 130 management table (S105).

Furthermore, the remote server 120 generates information which is an authentication table (management list, management information) in which the ID of the smart meter, the ID and the certificate of the HEMS-controller 110, and the ID and the certificate of each of the appliances 140 are associated with one another, and saves the authentication table in the database 160 (S106).

Lastly, the remote server 120 transmits to the smart meter 130, based on the authentication table generated in Step S106, the ID and the certificate of the HEMS-controller 110 and the ID and the certificate of each of the appliances 140 which are associated with the smart meter 130 (S107). The remote server 120 and the smart meter 130 communicate using a dedicated secure communication network. The secure network is a dedicated network to which only the infrastructure business operator which provides the smart meter 130 and the business operator of the remote server 120 can connect.

Next, specific configuration of each of the smart meter 130, the HEMS-controller 110, and the remote server 120 is described.

Figure 2:
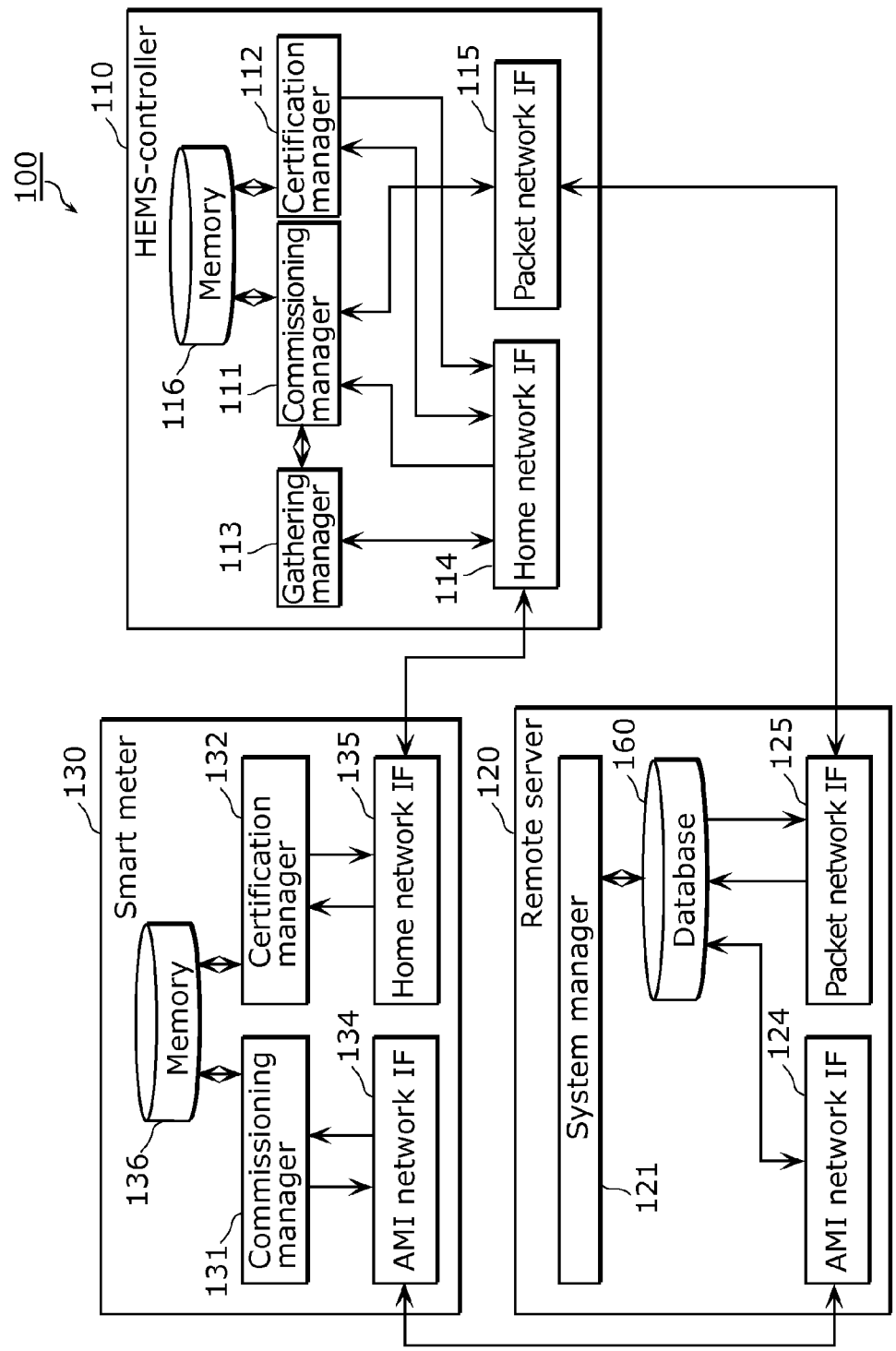
FIG. 2 is a block diagram showing a configuration of each of a smart meter, a HEMS-controller, and a remote server according to Embodiment 1.

FIG. 2 is a block diagram showing a configuration of each of the smart meter 130, the HEMS-controller 110, and the remote server 120.

First, the smart meter 130 is described.

As shown in FIG. 2, the smart meter 130 includes an AMI network IF 134 (third obtainment unit) and a home network IF 135 as communication interfaces.

The smart meter 130 also includes a commissioning manager 131, a certification manager 132 and a memory 136.

The commissioning manager 131 transmits the ID of the smart meter 130 to the remote server 120 through the AMI network IF 134. Furthermore, through the AMI network IF 134, the commissioning manager 131 receives from the remote server 120 the certificate of the HEMS-controller 110 and the certificate of each of the appliances 140 which are associated with the smart meter 130. Furthermore, the commissioning manager 131 saves in the memory 136 the certificate of the HEMS-controller 110 and the certificate of each of the appliances 140 received from the remote server 120.

The certification manager 132 authenticates the HEMS-controller 110 and the appliances 140 which are to be connected to the smart meter 130. Specifically, the certification manager 132 compares and determines whether or not the IDs and the certificates of the HEMS-controller 110 and the appliances 140 which made the authentication request to the smart meter 130 matches the IDs and certificates stored in the memory 136. If the matching is successful, the smart meter 130 permits network connection between (i) the HEMS-controller 110 and the appliances 140 which transmitted the authentication request and (ii) the smart meter 130.

In this embodiment, the network connection is a wireless communication network connection compliant with the Zigbee (Zigbee is a registered trademark) standard. However, the above-described network connection may be other wireless LAN connection (e.g., Wi-Fi (Wi-Fi is a registered trademark)) or a wired connection.

In the memory 136, the ID and the certificate of the HEMS-controller 110 and the ID and the certificate of each of the appliances 140 transmitted by the remote server 120 are saved (stored). The memory 136 is, for example, a dynamic random access memory (DRAM) or a ferrodielectric memory.

Next, the HEMS-controller 110 is described.

The HEMS-controller 110 includes a home network IF 114 (a first communication unit) and a packet network IF 115 (a second communication unit) as communication interfaces.

Furthermore, the HEMS-controller 110 includes: a gathering manager 113, a commissioning manager 111, a certification manager 112, and a memory 116.

The gathering manager 113 collects the IDs and the certificates of the appliances 140 from the appliances 140. The IDs and the certificates of the appliances 140 may be collected through a network by the gathering manager 113 or registered manually into the memory 116 by a manager of the HEMS-controller 110.

In this embodiment, the gathering manager 113 collects the IDs and the certificates of the appliances 140 through the wireless communication network compliant with the Zigbee standard. However, the above-described network connection may be other wireless LAN connection (e.g., Wi-Fi) or a wired connection.

The commissioning manager 111 transmits to the remote server 120 the ID and the certificate of the commissioning manager 111 itself, and the ID and the certificate of each of the appliances 140 collected by the gathering manager 113. At this time, the commissioning manager 111 also transmits, to the remote server 120, user information which indicates the user of the HEMS-controller 110.

The certification manager 112 makes an authentication request to the smart meter 130.

In the memory 116, the ID and the certificate of the HEMS-controller 110 itself, the IDs and the certificates of the appliances 140 connected to the HEMS-controller 110 are saved. The memory 116 is, for example, a DRAM or a ferrodielectric memory.

Next, the remote server 120 is described.

The remote server 120 is a so-called information processing apparatus, and includes a packet network IF 125 (second obtainment unit) and an AMI network IF 124 (first obtainment unit, transmitting unit) as communication interfaces. Furthermore, the remote server 120 includes the database 160, and a system manager 121.

The packet network IF 125 obtains, from the HEMS-controller 110 connected via the home network 101, the (i) ID and the certificate of the HEMS-controller 110 and (ii) the IDs and the certificates of the appliances 140 controlled by the HEMS-controller 110.

The AMI network IF 124 obtains the ID of the smart meter 130 from the smart meter 130 connected via the utility network 102.

Furthermore, the AMI network IF 124 transmits, to the smart meter 130, the ID and the certificate of the HEMS-controller 110 and the IDs and the certificates of the appliances 140. The certificate of the HEMS-controller 110 and the certificates of the appliances 140 are certificates which have been issued by the system manager 121 based on the authentication table.

In the database 160, the certificate of the HEMS-controller 110, the certificate of the appliance, and the ID of the smart meter are saved. The database 160 is implemented by, for example, a hard disc drive (HDD), a DRAM, or a ferrodielectric memory.

The system manager 121 creates, based on the user information, the authentication table in which (i) the ID of the smart meter 130 obtained by the AMI network IF 124 (ii) and the ID and the certificate of the HEMS-controller 110 and the IDs and the certificates of the appliances 140 obtained by the packet network IF 125 are associated with one another.

It should be noted that, the user information is information which can identify the user. The user information may be transmitted from the HEMS-controller 110 and the smart meter 130 along with the ID. Furthermore, the ID itself may be information which includes the user information. Furthermore, in the database 160 in the remote server 120, the user information which corresponds to the obtained ID may be stored beforehand, and the ID and the user information may be thus associated with each other.

Furthermore, based on the authentication table (management information) registered in the database 160, the system manager 121 issues, to the smart meter 130, the certificate of the HEMS-controller 110 and the certificates of the appliances 140 associated with the smart meter 130.

It should be noted that, as mentioned earlier, the Zigbee can be used as a communication protocol of the home network 101 in FIG. 1A. More specifically, the Zigbee can be used as a communication protocol between each of (i) the smart meter 130 and the HEMS-controller 110, (ii) the HEMS-controller 110 and the appliances 140, and (iii) the smart meter 130 and the appliances 140.

Next, the authentication table saved in the database 160 in the remote server 120 is described.

Figure 3:
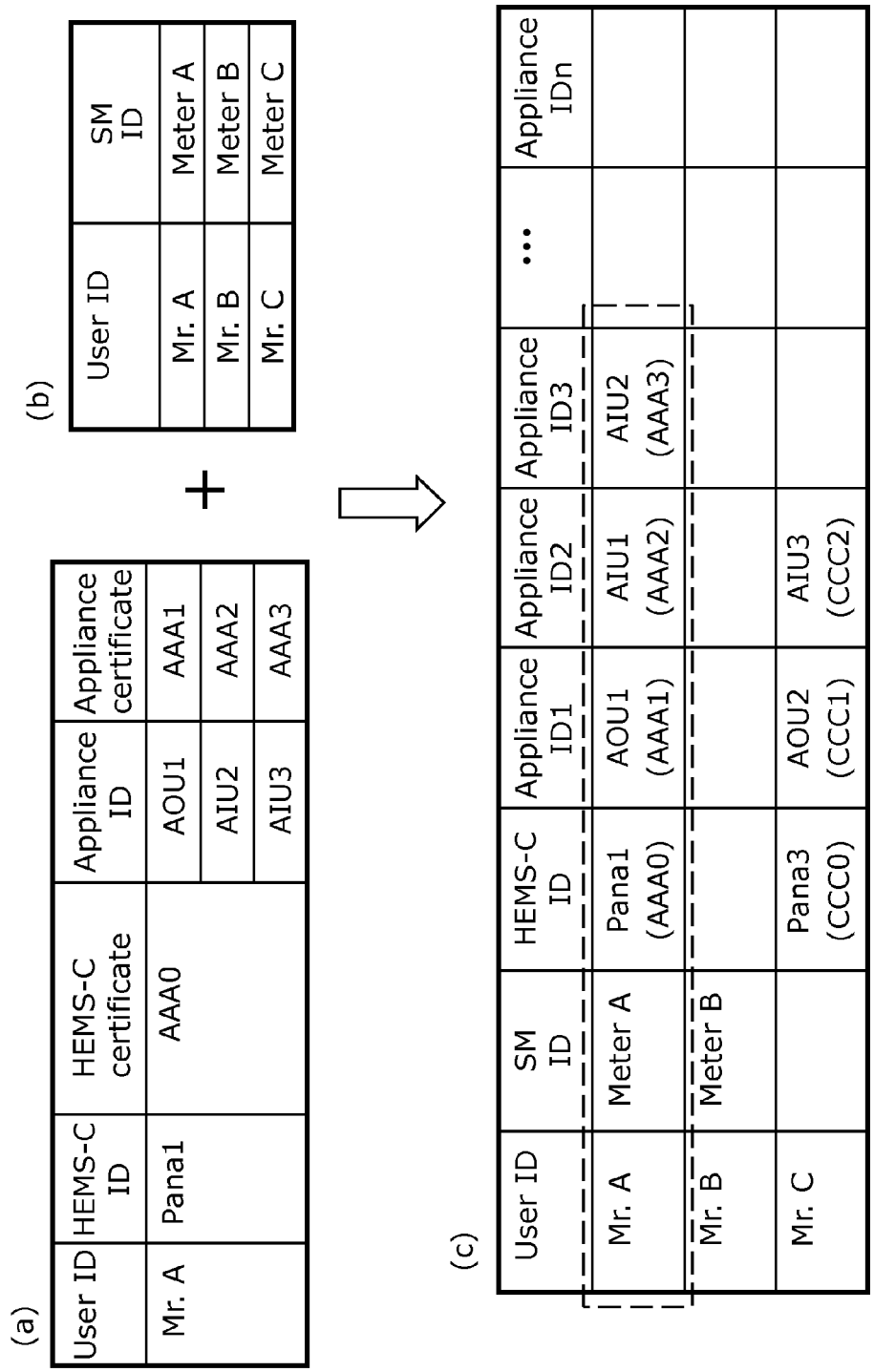
FIG. 3 is a diagram showing an example of a configuration of an authentication table saved in the database in the remote server according to Embodiment 1.

FIG. 3 is a diagram showing an example of a configuration of the authentication table saved in the database 160 in the remote server 120 shown in FIG. 2.

As shown in FIG. 3, the remote server 120 associates the ID information of the smart meter 130 with the IDs and the certificates of the HEMS-controller 110 and the appliances 140.

First, as shown in (a) in FIG. 3, a HEMS-C and appliance management table in which the HEMS-controller 110 and each of the appliances 140 are associated is saved in the database 160 in the remote server 120. The management table stores each of the user IDs (individual IDs, user information), the ID and the certificate of the HEMS-controller 110, and the ID and the certificate of the appliances 140 in association with one another.

For example, in the case of (a) in FIG. 3, each of IDs "AOU1", "AIU1", and "AIU2" of the appliances 140 connected to the HEMS-controller 110, and each of certificates "AAA1", "AAA2", and "AAA3" are associated with "Pana1", which is the HEMS-controller 110 of user "Mr. A", and certificate "AAA0".

Furthermore, as shown in (b) in FIG. 3, each of the user IDs (individual IDs) are associated with a corresponding one of the IDs of the smart meter 130 (SM IDs) and stored as a smart meter 130 management table in the database 160 in the remote server 120.

For example, in the case of (b) in FIG. 3, users "Mr. A", "Mr. B", and "Mr. C" are respectively associated with "meter A", "meter B", and "meter C" each of which is the smart meter 130.

Furthermore, the remote server 120 creates the authentication table from the HEMS-C and appliance management table and the smart meter 130 management table.

The authentication table in (c) in FIG. 3 shows that, for example, in the house of user "Mr. A", "meter A" which is the smart meter 130 is connected, and "Pana1" which is the HEMS-controller 110, and the appliances 140 having the IDs "AOU1", "AIU1", and "AIU2" are installed. The authentication table in (c) in FIG. 3 shows that the certificate of "Pana1" that is the HEMS-controller 110 which corresponds to "meter A" that is the smart meter 130 in the house of "Mr. A" is "AAA0", and the certificates of the appliances "AOU1", "AIU1", and "AIU2" are "AAA1", "AAA2", and "AAA3", respectively.

The smart meter 130 obtains the certificate of the HEMS-controller 110 and the certificates of the appliances 140 based on the authentication table in the remote server 120, and authenticates only an appliance for which the certificate is available. With this, spoofing of an appliance and unauthorized connection can be prevented.

Furthermore, when the smart meter 130 is connected to the HEMS-controller 110 and the appliances 140 which are communication targets that have been permitted by the smart meter 130 to connect, the smart meter 130 can transmit a control signal to the connected devices. Specifically, it becomes possible to provide various services in which the HEMS-controller 110, the appliances 140, and the smart meter 130 cooperate.

The following describes the details of operations performed by the device authentication system 100 having the above configuration.

Figure 4:
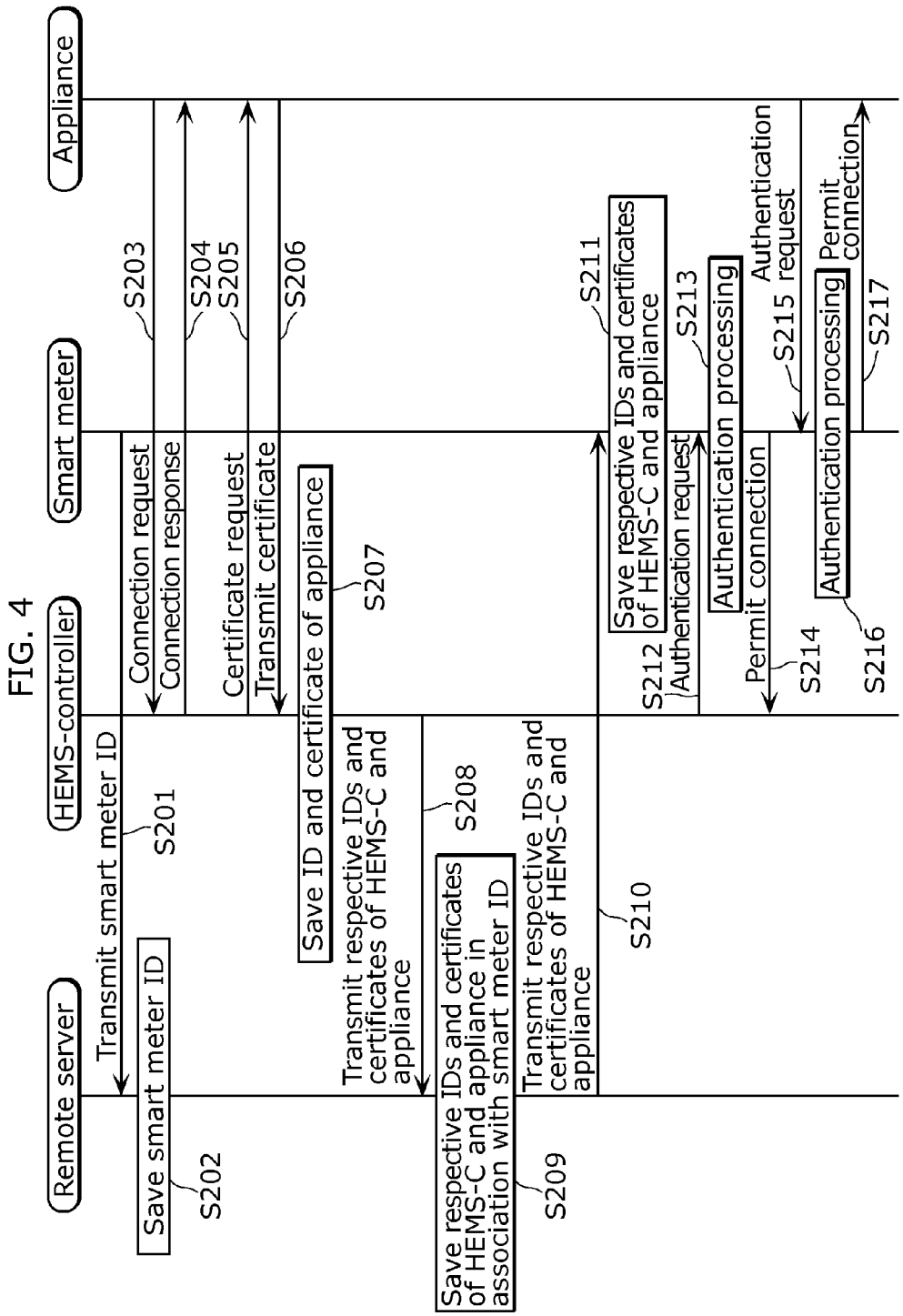
FIG. 4 is a sequence figure showing an exchange of data between devices according to Embodiment 1.

FIG. 4 is a sequence figure showing an exchange of data among the devices according to Embodiment 1.

First, the commissioning manager 131 of the smart meter 130 transmits, through the AMI network IF 134, the ID of the smart meter 130 itself to the remote server 120 (S201).

Next, after receiving the ID of the smart meter 130 transmitted through the AMI network IF 124 in Step S201, the remote server 120 saves in the database 160 the ID of the smart meter 130 and its user ID in association with each other (S202).

On the other hand, when receiving connection request from the appliances 140 which are not yet connected to the HEMS-controller 110 (S203), the HEMS-controller 110 transmits a connection response to such appliances 140, and thus connects such appliances 140 to the HEMS-controller 110 itself (S204). At this time, the HEMS-controller 110 obtains the ID of the appliances 140 which transmitted the connection request.

After this, the gathering manager 113 of the HEMS-controller 110 transmits, through the home network IF 114, a certificate request to each of the newly connected appliances 140 (S205).

Each of the appliances 140 which received the certificate request transmits its own certificate to the HEMS-controller 110 (S206). The gathering manager 113 of the HEMS-controller 110 receives the certificate through the home network IF 114, and saves the certificate in the memory 116 (S207).

When a plurality of appliances 140 is connected to the HEMS-controller 110, the HEMS-controller 110 obtains the certificate of each of the appliances 140 using a similar method.

Next, through the packet network IF 115, the commissioning manager 111 of the HEMS-controller 110 transmits to the remote server 120 the ID and the certificate of the HEMS-controller 110 itself and the IDs and the certificates of the appliances 140 (S208).

The remote server 120 saves in the database 160 the ID and the certificate of the HEMS-controller 110 and the IDs and the certificates of the appliances 140, which are received through the packet network IF 125, in association with one another (S209). In the database 160, the ID of the smart meter 130 and the IDs and the certificate information of each of the HEMS-controller 110 and the appliances 140 are saved in association with one another.

The system manager 121 of the remote server 120 refers to the database 160, and transmits the ID and the certificate of the HEMS-controller 110 and the ID and the certificate of the appliance which correspond to the ID of the smart meter 130, to the smart meter 130 (S210).

The commissioning manager 131 of the smart meter 130 receives, through the AMI network IF 134, the ID and the certificate of the HEMS-controller 110 and the IDs and the certificates of the appliances 140. These IDs and the certificates are saved in the memory 136 of the smart meter 130 (S211).

The certification manager 112 of the HEMS-controller 110 transmits the authentication request to the smart meter 130 through the home network IF 114 (S212). The timing for transmitting the authentication request is not particularly limited. For example, the HEMS-controller 110 may transmit the authentication request to the smart meter 130, when notified from the remote server 120 that the remote server 120 has transmitted the ID and the certificate of the HEMS-controller and the IDs and the certificates of the appliances 140 to the smart meter 130. Furthermore, the HEMS-controller 110 may transmit the authentication request to the smart meter 130 after a predetermined time from the time when the HEMS-controller 110 transmitted the ID and the certificate of the HEMS-controller 110 and the IDs and the certificates of the appliances 140 to the remote server 120 (S208).

Next, when receiving the authentication request through the home network IF 135, the certification manager 132 of the smart meter 130 compares (i) the certificate which is saved in the memory 136 and corresponds to the ID of the HEMS-controller 110 that transmitted the authentication request and (ii) the certificate received through the home network IF 135 (S213). When both certificates are the same, the smart meter 130 permits (authenticates) connection of the HEMS-controller 110 (S214).

Here, at the time of the authentication request, the certificate may be used as it is or an authentication key generated using the certificate may be used. For example, there is the method of generating and using an authentication key using a hash function from a certificate.

With the connection permission received from the smart meter 130 through the home network IF 114, it becomes possible for the HEMS-controller 110 to communicate with the smart meter 130.

It should be noted that each of the appliances 140 connected to the HEMS-controller 110 is also authenticated by the smart meter 130 using a similar method as the authentication processing (S212 to S214) of the HEMS-controller 110, so that it becomes possible for the appliances 140 to communicate with the smart meter 130 (S215 to S217).

The certificates of the HEMS-controller 110 and the appliances 140 may be, for example, the same. Furthermore, it is also acceptable to set the same certificate for the appliances 140 of the same type. Moreover, the certificates of the HEMS-controller 110 and the appliances 140 may be different from one another.

The user ID may be an arbitrary ID or information, such as the name or the address of the house of the user.

As described above, in the device authentication system 100 according to this embodiment, the HEMS-controller 110 in the house of a user and the appliances 140 connected to the HEMS-controller 110 can be set as the communication target devices of the smart meter 130 through the remote server 120, without intervention of a human. After the setting is made, the HEMS-controller 110 and the appliances 140 connected to the HEMS-controller 110 can be connected to the smart meter 130. Thus, various services using the HEMS-controller 110, the appliances 140, and the smart meter 130 in cooperation with one another can be provided.

Furthermore, the smart meter 130 obtains the certificate of the HEMS-controller 110 and the certificates of the appliances 140 based on the authentication table in the remote server 120. More specifically, only the HEMS-controller 110 and the appliances 140 for which the certificates are available can obtain the connection permission. Thus, an unauthorized connection by a device spoofing a communication target device or the like can be prevented.

It should be noted that, in the device authentication system 100 according to this embodiment, the operations performed by the HEMS-controller 110 are particularly distinctive.

The operations performed by the HEMS-controller 110 in Step S203 and Step S204 are so called a pairing operation (second pairing) that connects the HEMS-controller 110 and the appliances 140 via the wireless network. It should be noted that, the second pairing is performed, for example, by simultaneously holding down a button switch provided on the HEMS-controller 110 and a button switch provided on each of the appliances 140.

The second pairing is performed to enable the HEMS-controller 110 to obtain the IDs and the certificates of the appliances 140. Specifically, the second pairing is, so to speak, a temporary pairing that is performed preliminarily before the final pairing (first pairing) that connects the smart meter 130, the HEMS-controller 110, and the appliances 140 via the wireless network. Therefore, after obtaining the authentication information of the appliances 140, the second pairing is usually canceled before the first pairing is performed.

Primarily, the second pairing is performed to enable the HEMS-controller 110 to obtain the IDs and the certificates of the appliances 140. However, the second pairing also makes it possible to determine beforehand whether the HEMS-controller 110 and the appliance can be connected via the wireless network.

For example, with the second pairing, the business operator who installed the device (or the user) can find beforehand whether the HEMS-controller 110 and the appliances 140 are installed at locations in a range which allows wireless network connection. Furthermore, for example, existence or absence of trouble in wireless communication functions of the HEMS-controller 110 and the appliances 140 can also be found beforehand.

Embodiment 2

Figure 5:
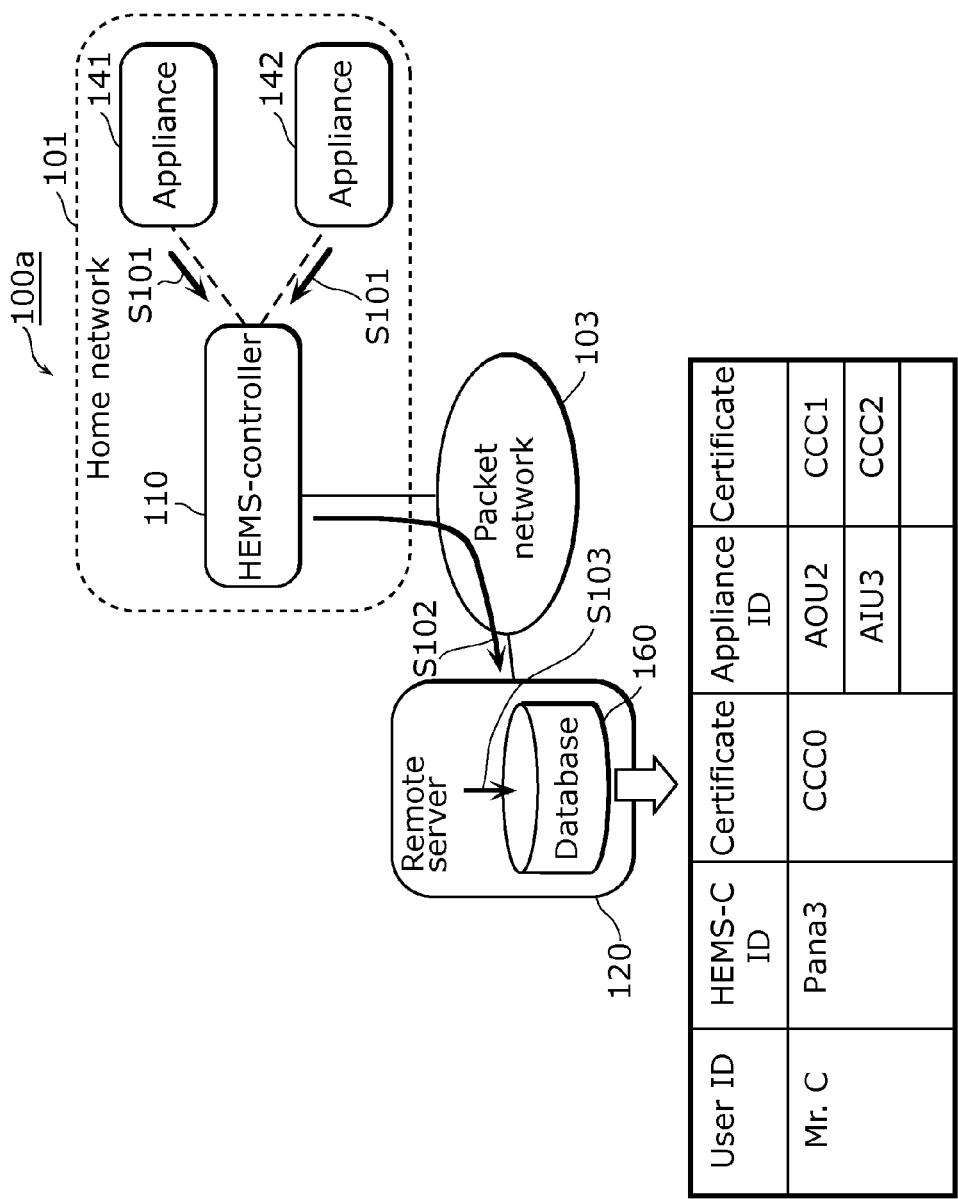
FIG. 5 is a system configuration figure of a device authentication system according to Embodiment 2.

FIG. 5 is a system configuration figure of a device authentication system according to Embodiment 2. Different from Embodiment 1, a device authentication system 100a shown in FIG. 5 shows a system configuration which does not include a smart meter 130.

In FIG. 5, in a similar manner as in Embodiment 1, the ID and the certificate of a HEMS-controller 110 and the IDs and the certificates of appliances 140 are saved in a database 160 in a remote server 120. For example, the management table in FIG. 5 shows that the HEMS-controller 110 having the ID "Pana3" and appliances having the IDs "AOU2" and "AIU3" are installed for user "Mr. C". Furthermore, the management table in FIG. 5 shows that the certificate of "Pana3", which is the HEMS-controller 110, is "CCC0", and certificates of the appliances "AOU2" and "AIU3" are "CCC1" and "CCC2", respectively.

Figure 6:
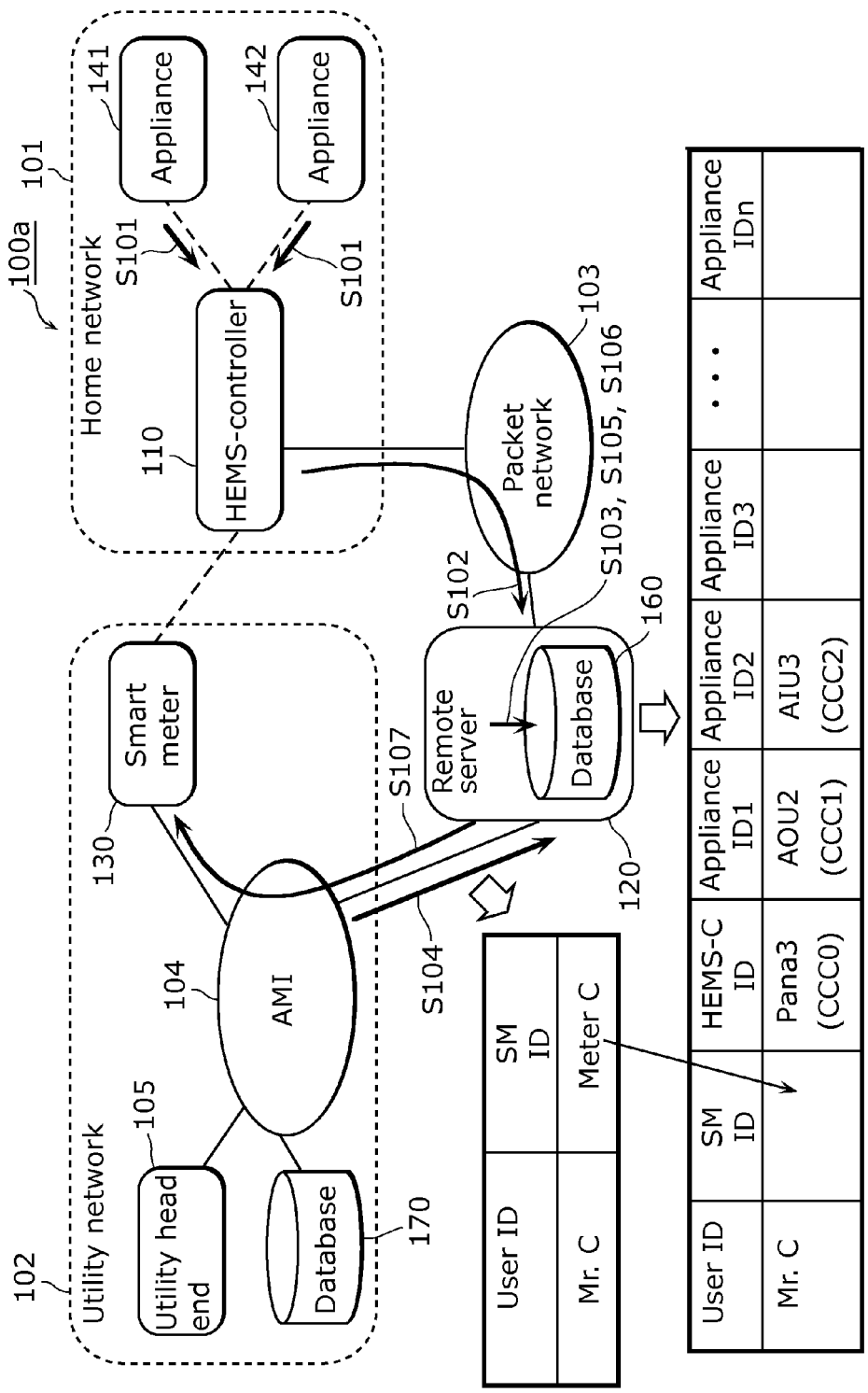
FIG. 6 is a system configuration figure in which a utility system is connected to the initial state (FIG. 5) in Embodiment 2.

FIG. 6 shows a system configuration figure in which, in addition to the initial state of this embodiment (FIG. 5), a utility system (a utility network 102) including the smart meter 130 is connected to the device authentication system 100a. In FIG. 6, the smart meter 130 which does not exist in the initial state (FIG. 5) is connected to the HEMS-controller 110, and a utility head end 105 starts providing a service to each of users.

In the device authentication system 100a, after the utility network 102 is connected to the device authentication system 100a as shown in FIG. 6, ID information of the smart meter 130 is registered into the database 160 in the remote server 120 as with Embodiment 1. When the ID information of the smart meter 130 is registered into the database 160, the remote server 120 creates an authentication table.

The authentication processing to the smart meter 130 after the creation of the authentication table is executed in a similar manner as in Embodiment 1.

According to this embodiment, before the smart meter 130 is connected to the remote server 120, the HEMS-controller 110 performs beforehand the setting of the appliances 140 connected to the HEMS-controller 110 itself, and transmits the ID and the certificate of the HEMS-controller 110 and the IDs and the certificates of the appliances 140 to the remote server 120.

With this, when the smart meter 130 is connected to the remote server 120, the ID and the certificate of the HEMS-controller 110 and the IDs and the certificates of the appliances 140 are already saved in the database 160 in the remote server 120. Thus, an authentication time, which is the time from when the smart meter 130 is connected till when the HEMS-controller 110 and the appliances 140 are authenticated by the smart meter 130, can be reduced.

Embodiment 3

Figure 7:
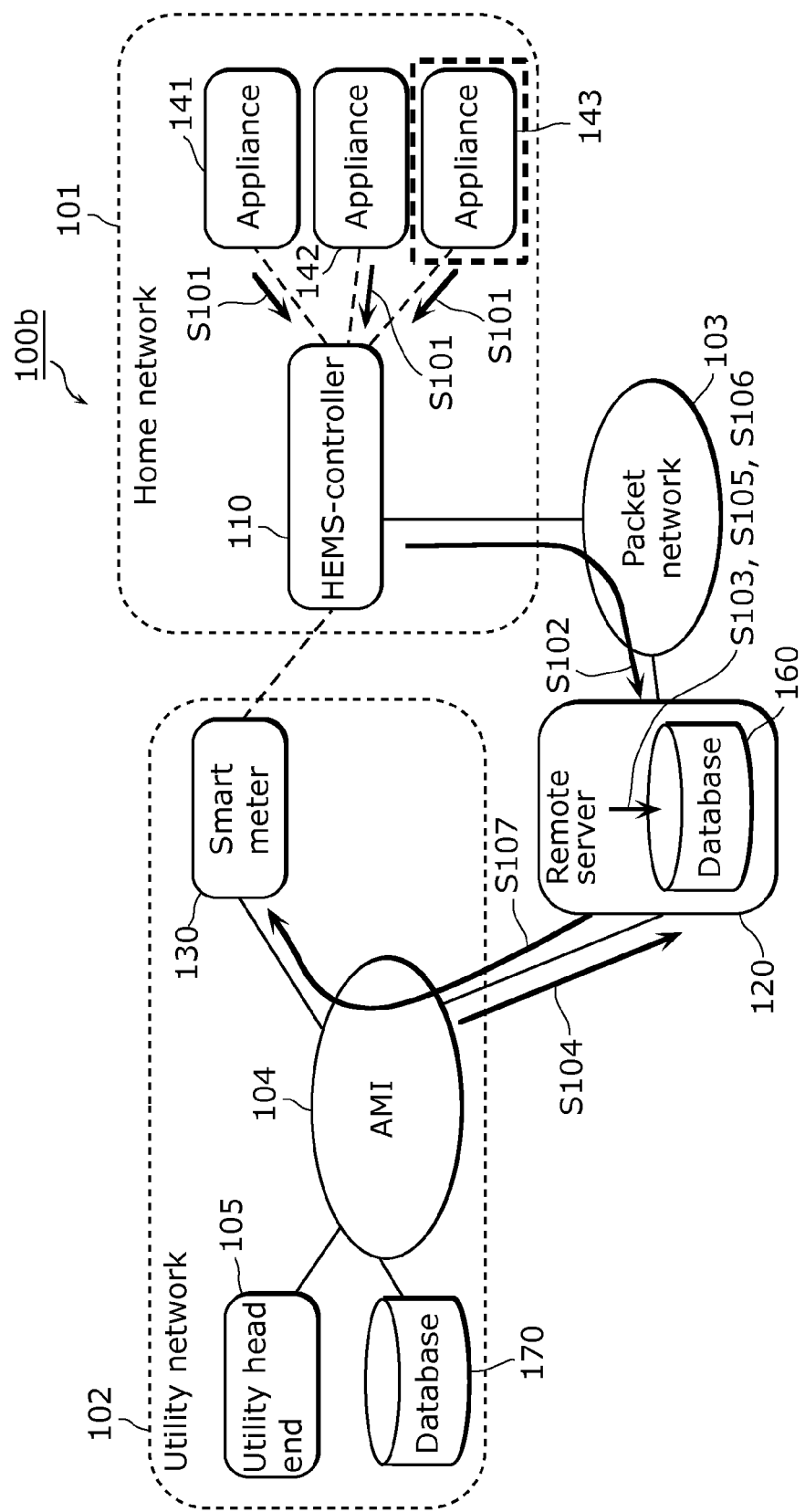
FIG. 7 is a system configuration figure of a device authentication system according to Embodiment 3.

FIG. 7 is a system configuration figure of a device authentication system according to Embodiment 3. Embodiment 3 describes an example in which, after the network has been formed as described in Embodiment 1, new appliances 140 are connected to a HEMS-controller 110 in a device authentication system 100b.

FIG. 7 is a diagram showing an example in which an appliance 143 is newly installed in a house of a user.

FIG. 8 is a diagram showing an example of updating of data in a database 160 in a remote server 120, which occurs when the new appliance 143 is connected to the HEMS-controller 110 in Embodiment 3.

Shown in (a) in FIG. 8 is a HEMS-C and appliance management table before the installation of the appliance 143. When the new appliance 143 is registered, the HEMS-controller 110 transmits to the remote server 120 the ID and the certificate ((b) in FIG. 8) of the new appliance 143 in a similar manner as in Embodiment 1. FIG. 8 shows an example in which the ID and the certificate of the newly registered appliance 143 are "AIU4" and "CCC3", respectively.

When the HEMS-C and appliance management table is updated, the authentication table is also updated, as shown in (c) in FIG. 8. When the authentication table is updated, as described in Embodiment 1, the remote server 120 transmits the certificate of the new appliance 143 to the smart meter 130. With the certificate of the new appliance 143, the smart meter 130 can authenticate the new appliance 143.

Variations

It should be noted that although the present disclosure has been described based on the above-described embodiments, the present disclosure is not limited to these embodiments.

For example, in each of Embodiments 1 to 3 above, the number of the appliances 140 is two or three. However, the number of the appliances 140 may be four or more. More specifically, irrespective of the number of the appliances 140, authentication processing to the smart meter 130 can be executed.

Furthermore, although each of the above embodiments described an example in which a single smart meter 130 and a single HEMS-controller 110 are provided in one house, a plurality of the smart meters 130 may be provided in one house, and a plurality of HEMS-controllers 110 may be provided in one house. Furthermore, a plurality of households (users) may be managed by a single smart meter 130, or appliances of a plurality of households (users) may be managed by a single HEMS-controller 110. Furthermore, a plurality of the HEMS-controllers 110 may be connected to a single smart meter 130.

Furthermore, it has been described in each of the above embodiments that each of the HEMS-controller 110 and the appliances 140 makes the authentication request to the smart meter 130. However, the HEMS-controller 110 may transmit to the smart meter 130, in a batch, an authentication request for the HEMS-controller 110 itself and an authentication request for each of the appliances 140 on which the HEMS-controller 110 performs control. This makes the processing of authentication to the smart meter 130 more easy.

It should be noted that, although each of the above embodiments described an example in which the HEMS-controller 110 controls each of the appliances 140, it is also acceptable to have a configuration in which one of the appliances 140 includes the function of the HEMS-controller 110 and controls the rest of the appliances 140. In other words, the HEMS-controller 110 may be implemented as one of the functions of the appliances 140.

Furthermore, although a dedicated secure communication network is used for communication between the remote server 120 and the smart meter 130 in each of the above-described embodiments, a general-purpose network, such as the Internet, may be used for communication between the remote server 120 and the smart meter 130. In this case, it is preferable that the ID and the certificate are transmitted in a secure manner, for example by encrypting the ID and the certificate.

It should be noted that an extensible markup language (XML) or a simple object access protocol (SOAP) may be used for communication between the remote server 120 and the smart meter 130.

Furthermore, although the above embodiments described that the HEMS-controller 110 obtains the IDs and the certificates from the appliances 140, the HEMS-controller 110 may obtain only the IDs from the appliances 140.

In this case, as the above-described IDs, the HEMS-controller 110 obtains, from the appliances 140, manufacturer install codes or other numbers that can identify the appliances 140, and transmits such codes or numbers to the remote server 120. The respective manufacturers of the appliances 140 can uniquely identify each of the appliances 140 with the manufacture install code. Specifically, an example of the manufacture codes is the MAC addresses of the appliances 140.

Furthermore, for example, Zigbee manufacturer specific extension codes may be used as the IDs of the appliances 140. The extended codes are the codes that are assigned when the HEMS-controller 110 and the appliances 140 are connected wirelessly via Zigbee.

As above, in the case where the HEMS-controller 110 obtains from the appliances 140 only the IDs, the manufacturer of the appliances 140 creates a database of the IDs of the appliances 140 and certificates corresponding to the IDs. Furthermore, the remote server 120 accesses the database or stores therein the database in advance. With this, by obtaining only the ID from the HEMS-controller 110, the remote server 120 can transmit to the smart meter 130 the corresponding certificate.

Such a configuration is more secure because transmitting and receiving of the certificate is not performed between the HEMS-controller 110 and the remote server 120.

Furthermore, the configuration in which the HEMS-controller 110 queries the remote server 120 to find out whether the HEMS-controller 110 is selecting the correct smart meter 130 corresponding to the HEMS-controller 110 is also acceptable.

When a plurality of the wirelessly connectable smart meters 130 exist, there are cases where the HEMS-controller 110 cannot determine which one of the smart meters 130 is the correct smart meter 130 corresponding to the HEMS-controller 110 itself. In such a case, the HEMS-controller 110 may transmit to the remote server 120 a query request regarding the smart meter 130. At this time, along with the query request, the HEMS-controller 110 may transmit, as position information of the detected nearby smart meters 130, a relative strength of the signal used for wireless communication, GPS coordinates, fingerprints of the wireless environment, or the like of each of the smart meters 130.

When receiving the query request from the HEMS-controller 110, the remote server 120 further retrieves related information, such as the customer premise postal address in the house of the user in which the HEMS-controller 110 is provided, a customer name, and a customer identifier (e.g., a national registration number, a driving license number, and a passport number). It should be noted that such information may have been obtained at the time of a customer registration for a service that uses the remote server 120 or the smart meter 130. Based on the retrieved information, the remote server 120 notifies the HEMS-controller 110 the correct smart meter 130 which corresponds to the HEMS-controller 110.

Furthermore, at this time, the remote server 120 may query the utility network 102 (the utility head end 105) to find out which one of the smart meters 130 is the correct smart meter 130 corresponding to the HEMS-controller 110.

At this time, a part of the customer identifier above may be used as a basis which enables the utility network 102 to determine the correct smart meter 130.

Furthermore, the present disclosure also includes the following.

(1) Each of the above apparatuses can be, specifically, realized by a computer system configured from a microprocessor, a ROM, a RAM, a hard disk unit, a display unit, a keyboard, and a mouse, for example. A computer program is stored in the RAM or the hard disk unit. Each of the apparatuses achieves its function as a result of the microprocessor operating according to the computer program. Here, the computer program is configured of a plurality of pieced together instruction codes indicating a command to the computer in order to achieve a given function.

(2) A portion or all of the structural elements of each of the above apparatuses may be configured from one system large scale integration (LSI). A system LSI is a super-multifunction LSI manufactured with a plurality of structural units integrated on a single chip, and is specifically a computer system configured of a microprocessor, a ROM, and a RAM, for example. A computer program is stored in the ROM. The system LSI achieves its function as a result of the microprocessor loading the computer program into the RAM from the ROM, and performing an operation or the like according to the loaded computer program.

(3) A portion or all of the structural elements of each of the above apparatuses may each be configured from an IC card detachable from the apparatus or a stand-alone module. The IC card or the module is a computer system configured from a microprocessor, a ROM, and a RAM, for example. The IC card or the module may include the super-multifunction LSI described above. The IC card or the module achieves its function as a result of the microprocessor operating according to a computer program. The IC card and the module may be tamper-proof.

(4) The present disclosure may be realized using a method shown above. Moreover, the present disclosure may also be realized by a computer program realizing these methods with a computer or by a digital signal of the computer program.

Moreover, the present disclosure may also be realized as a computer-readable recording medium, such as a flexible disk, a hard disk, a CD-ROM, a MO, a DVD, a DVD-ROM, a DVD-RAM, a Blu-ray disc (BD), or a semiconductor memory, on which the computer program or the digital signal is recorded. The present disclosure may also be realized by the digital signal recorded in the above mentioned recording media.

Moreover, the present disclosure may also be realized by transmitting the computer program or the digital signal, via an electric communication line, a wireless or wired line, a network typified by the Internet, data broadcasting, or the like.

Moreover, the present disclosure may be a computer system including a microprocessor and a memory, the memory storing the computer program and the microprocessor operating according to the computer program.

Moreover, the program or the digital signal may be executed by another independent computer system, with the program or the digital signal recorded and transported in a recording media or with the program or the digital signal transported via the network or the like.

(5) The above embodiments and variations may be combined with each other.

Although the exemplary embodiments have been described thus far, the scope of claims of the present application is not limited to these embodiments. Those skilled in the art will readily appreciate that various modifications may be made to the above-described embodiments and other embodiment may be obtained by arbitrarily combining structural elements in the above-described embodiments without materially departing from the novel teachings and advantages of the subject matters described in the attached CLAIMS. Accordingly, such variations and other embodiments are included within the scope of the present disclosure.

INDUSTRIAL APPLICABILITY

The present disclosure is useful as a device authentication method or the like used for authentication of a device by a smart meter in a home energy management system (HEMS) or the like.

The invention claimed is:

1. A method of setting an identification (ID) and authentication information for each of a plurality of devices, and authenticating network connection between a smart meter and the devices by using a server connected to (i) the smart meter via a first communication network and (ii) a controller, which is one of the devices, via a second communication network, the method comprising:
    obtaining, by the server from the smart meter, an ID of the smart meter via the first communication network, the ID being associated with user information of the smart meter;
    obtaining, by the server from the controller, (i) an ID and authentication information of the controller which are associated with user information of the controller and (ii) an ID and authentication information of an appliance, the controller and the appliance each being one of the devices, and the ID and the authentication information of the controller and the ID and the authentication information of the appliance being obtained by the server from the controller via the second communication network without communication with the smart meter;
    generating, by the server, based on the user information of the smart meter and the user information of the controller, management information in which the ID of the smart meter, the ID and the authentication information of the controller, and the ID and the authentication information of the appliance are associated with one another;
    transmitting, by the server, based on the management information, the ID and the authentication information of the controller and the ID and the authentication information of the appliance which are associated with the ID of the smart meter, to the smart meter;
    transmitting, by the controller, an authentication request to the smart meter, the authentication request being information which requests authentication, the authentication request including an ID and authentication information; and
    obtaining, by the controller from the smart meter in response to the authentication request, permission to establish a network connection between the controller and the smart meter,
    wherein the controller controls the appliance.

2. The method according to claim 1, further comprising:
    when new device information is obtained via the second communication network, the new device information being (i) an ID and authentication information of the controller which are not included in the management information or (ii) an ID and authentication information of the appliance which are not included in the management information:
    updating the management information by adding the new device information to the management information in association with the ID of the smart meter; and
    transmitting the new device information to the smart meter having the ID associated with the new device information.

3. The method according to claim 1,
wherein the first communication network is a secure communication network dedicated to communication with the smart meter.

4. The method according to claim 1,
wherein the controller is a home energy management system (HEMS) controller which controls a device among the devices.

5. The method according to claim 1,
wherein the ID of each of the devices is a media access control (MAC) address.

6. The method according to claim 1,
wherein the ID of the smart meter and the user information of the smart meter are managed in a predetermined storage and associated with each other,
the ID of the controller and the user information of the controller are managed in the predetermined storage and associated with each other, and
in the generating of management information, the management information is generated by referring to the predetermined storage.

7. The method according to claim 1,
wherein the ID of the smart meter includes the user information of the smart meter and is associated with the user information of the smart meter, and
the ID of the controller includes the user information of the controller and is associated with the user information of the controller.

8. The method according to claim 1,
wherein the ID of the smart meter is obtained along with the user information of the smart meter and is associated with the user information of the smart meter, and
the ID of the controller is obtained along with the user information of the controller and is associated with the user information of the controller.

9. A device authentication method for authenticating network connection between a smart meter and a plurality of devices by using a server connected to (i) the smart meter via a first communication network and (ii) a controller, which is one of the devices, via a second communication network, the method comprising:
    obtaining, by the controller, an identification (ID) and authentication information of an appliance that is one of the devices;
    transmitting, by the controller, the ID and the authentication information of the appliance obtained and the ID and the authentication information of the controller to the server;
    obtaining, by the server from the smart meter, an ID of the smart meter via the first communication network, the ID being associated with user information of the smart meter;
    obtaining, by the server from the controller, the ID and the authentication information of the controller and the ID and the authentication information of the appliance which are associated with user information of the controller, the ID and the authentication information of the controller and the ID and the authentication information of the appliance being obtained by the server from the controller via the second communication network without communication with the smart meter;

generating, by the server, management information based on the user information of the smart meter and the user information of the controller, the management information including, in association with one another, the ID of the smart meter, and the ID and the authentication information of the controller and the ID and the authentication information of the appliance obtained;

transmitting, by the server, based on the management information, the ID and the authentication information of the controller and the ID and the authentication information of the appliance which are associated with the ID of the smart meter, to the smart meter;

transmitting, by the controller, an authentication request to the smart meter, the authentication request being information which requests authentication, the authentication request including an ID and authentication information; and obtaining, by the controller from the smart meter in response to the authentication request, permission to establish a network connection between the controller and the smart meter, wherein the controller controls the appliance.

10. The method according to claim 9, the method further comprising:

obtaining, by the smart meter, the ID and the authentication information of the controller and the ID and the authentication information of the appliance from the server; and when the smart meter receives an authentication request from the controller or the appliance, (i) determining, by the smart meter, whether an ID and authentication information included in the authentication request match the ID and the authentication information obtained by the smart meter from the server and, (ii) when the ID and the authentication information in the authentication request match the ID and the authentication information obtained by the smart meter from the server, permitting, by the smart meter, a network connection between the controller or the appliance which transmitted the authentication request and the smart meter, the authentication request being information which requests authentication.

11. The method according to claim 9, wherein the controller communicates with the appliance by a wireless communication compliant with a Zigbee (Zigbee is a registered trademark) standard to obtain the ID and the authentication information of the appliance.

12. A device authentication system in which an identification (ID) and authentication information of each of devices are set to a smart meter by a server, the ID and the authentication information being used for authentication for network connection between the smart meter and the devices, the system comprising:

a controller that is one of the devices; and the server connected to (i) the smart meter via a first communication network and (ii) the controller via a second communication network, wherein the controller performs:

obtaining an ID and authentication information of an appliance that is one of the devices; and transmitting (i) the ID and the authentication information of the appliance and (ii) the ID and the authentication information of the controller to the server, wherein the server performs:

obtaining, from the smart meter, an ID of the smart meter via the first communication network, the ID being associated with user information of the smart meter;

obtaining, from the controller, an ID and authentication information of the controller and the ID and the authentication information of the appliance which are associated with user information of the controller, the ID and the authentication information of the controller and the ID and the authentication information of the appliance being obtained from the controller via the second communication network without communication with the smart meter;

generating, based on the user information of the smart meter and the user information of the controller, management information in which the ID of the smart meter, the ID and the authentication information of the controller, and the ID and the authentication information of the appliance are associated with one another; and transmitting, based on the management information, the ID and the authentication information of the controller and the ID and the authentication information of the appliance which are associated with the ID of the smart meter, to the smart meter, wherein the controller further performs:

transmitting an authentication request to the smart meter, the authentication request being information which requests authentication, the authentication request including an ID and authentication information; and obtaining, from the smart meter in response to the authentication request, permission to establish a network connection between the controller and the smart meter, and wherein the controller controls the appliance.

13. A device authentication system in which an identification (ID) and authentication information are set for each of a plurality of devices, and network connection between a smart meter and the devices is authenticated by using a server connected to (i) the smart meter via a first communication network and (ii) a controller, which is one of the devices, via a second communication network, the system comprising:

the controller; and the server, wherein the server performs:

obtaining, from the smart meter, an ID of the smart meter via the first communication network, the ID being associated with user information of the smart meter;

obtaining, from the controller, (i) an ID and authentication information of a controller which are associated with user information of the controller and (ii) an ID and authentication information of an appliance, the controller and the appliance each being one of the devices, and the ID and the authentication information of the controller and the ID and the authentication information of the appliance being obtained from the controller by via the second communication network without communication with the smart meter;

generating, based on the user information of the smart meter and the user information of the controller, management information in which the ID of the smart meter obtained by the first obtainment unit, and the ID and the authentication information of the controller and the ID and the authentication information of the appliance obtained by the second obtainment unit are associated with one another; and transmitting, based on the management information, the ID and the authentication information of the controller and the ID and the authentication information of the appliance which are associated with the ID of the smart meter, to the smart meter, and wherein the controller further performs:

transmitting an authentication request to the smart meter, the authentication request being information which requests authentication, the authentication request including an ID and authentication information; and obtaining, from the smart meter in response to the authentication request, permission to establish a network connection between the controller and the smart meter, and wherein the controller controls the appliance.

14. A method of setting an identification (ID) and authentication information for each of devices to a smart meter, the ID and the authentication information being used for authentication for network connection between the smart meter and the devices, the method comprising:

obtaining, by a server from the smart meter, an ID of the smart meter via a first communication network, the ID being associated with user information of the smart meter;

obtaining, by a controller, an ID and authentication information of an appliance, the controller and the appliance each being one of the devices and being connected via a second communication network;

obtaining, by the server from the controller, (i) an ID and authentication information of the controller which are associated with user information of the controller and (ii) the ID and the authentication information of the appliance which are obtained by the controller, the ID and the authentication information of the controller and the ID and the authentication information of the appliance being obtained by the server via the second communication network without communication with the smart meter;

generating, based on the user information of the smart meter and the user information of the controller, management information in which the ID of the smart meter, the ID and the authentication information of the controller, and the ID and the authentication information of the appliance are associated with one another;

transmitting, based on the management information, the ID and the authentication information of the controller and the ID and the authentication information of the appliance which are associated with the ID of the smart meter, to the smart meter;

transmitting, by the controller, an authentication request to the smart meter, the authentication request being information which requests authentication, the authentication request including an ID and authentication information; and obtaining, by the controller from the smart meter in response to the authentication request, permission to establish a network connection between the controller and the smart meter, wherein the controller controls the appliance.

15. The method according to claim 14, wherein after receiving the authentication request from the controller, the smart meter (i) determines whether the ID and the authentication information included in the authentication request match the ID and the authentication information obtained by the smart meter from the server and (ii) when the ID and the authentication information in the authentication request match the ID and the authentication information obtained by the smart meter from the server, transmits, to the controller, the permission to establish a network connection between the controller and the smart meter.

* * * * *